United States Patent
Keesling

[11] Patent Number: 5,922,257
[45] Date of Patent: Jul. 13, 1999

[54] PROCESS TO PRODUCE AN ARTICLE THAT HAS A GRANITE-LIKE APPEARANCE AND SAID ARTICLE

[75] Inventor: James E. Keesling, Bartlesville, Okla.

[73] Assignee: Phillips Petroleum Company, Bartlesville, Okla.

[21] Appl. No.: 08/925,988

[22] Filed: Sep. 9, 1997

Related U.S. Application Data

[51] Int. Cl.$^6$ .................................................. B29C 47/04
[52] U.S. Cl. ........................... 264/75; 264/73; 264/122; 264/176.1; 264/245; 264/331.17; 264/349; 523/171; 523/221; 524/528; 524/581; 428/327; 428/402
[58] Field of Search .................... 523/221, 171; 524/581, 528; 264/73, 75, 122, 176.1, 211, 245, 331.17, 349; 428/327, 402

[56] References Cited

U.S. PATENT DOCUMENTS

| | | | |
|---|---|---|---|
| 4,085,246 | 4/1978 | Buser et al. | 428/220 |
| 4,107,135 | 8/1978 | Duggins et al. | 523/457 |
| 4,137,215 | 1/1979 | Van Gasse | 523/171 |
| 4,235,948 | 11/1980 | Holmes | 428/15 |
| 4,433,070 | 2/1984 | Ross et al. | 523/171 |
| 4,849,456 | 7/1989 | Champion | 521/54 |
| 5,187,202 | 2/1993 | Walkowski | 524/35 |
| 5,232,644 | 8/1993 | Hammond et al. | 264/73 |
| 5,304,592 | 4/1994 | Ghahary | 524/437 |

*Primary Examiner*—Mark L. Warzel
*Attorney, Agent, or Firm*—Carl D. Corvin

[57] ABSTRACT

A process to produce an article having a granite-like appearance is disclosed which consists essentially of (a) extruding a first mixture to form a second mixture; and (b) using the second mixture to form an article having a granite-like appearance. The first and second mixtures are in the form of particles where the first mixture consists essentially of about 99 to about 90 wt. % of a first particle composition and about 1 to about 10 wt. % of a second particle composition. The first particle composition consists essentially of a first polymer which consists essentially of a thermoplastic (co) polymer of ethylene and the second particle composition consists essentially of a colorant and a second polymer which consists essentially of a crosslinked thermoset (co) polymer of ethylene. The second polymer does not have a density which is substantially isopycnic compared to the first polymer Extrusion is performed at a temperature above the melting point of the first polymer but below the melting point of the second polymer and the decomposition temperature of the first polymer. In preferred embodiments, the first polymer is a copolymer of ethylene and hexene having a density of 0.880 to 0.952 g/cm$^3$ and the second polymer is a copolymer of ethylene and hexene having a density of less than 0.941 g/cm$^3$ or greater than 0.946 g/cm$^3$, or the first polymer is a copolymer of ethylene and hexene having a density greater than 0.958 g/cm$^3$ and the second polymer is a copolymer of ethylene and hexene having a density less than 0.941 g/cm$^3$.

40 Claims, No Drawings

PROCESS TO PRODUCE AN ARTICLE THAT HAS A GRANITE-LIKE APPEARANCE AND SAID ARTICLE

FIELD OF THE INVENTION

This invention is related to the field of processes that produce articles that have a granite-like appearance.

BACKGROUND OF THE INVENTION

Slabs of granite have long been used as a standard for decorative, functional, long-lasting, construction materials. However, the price of granite is very high when compared to other materials. Additionally, granite is very dense and brittle, which makes it difficult to transport and install.

Several attempts have been made to produce light-weight articles that have a granite-like appearance. However, all of these attempts use very complicated processes and/or complicated compositions.

Therefore the inventor provides an easy process to form articles that have a granite-like appearance.

SUMMARY OF THE INVENTION

It is an object of this invention to provide a process to produce an article that has a granite-like appearance.

It is another object of this invention to provide an article that has a granite-like appearance.

In accordance with this invention a process is provided where said process consists essentially of:

(a) extruding a first mixture to form a second mixture where, (1) said first and second mixtures are in the form of particles, (2) said first mixture consists essentially of about 99 to about 90 weight percent of a first composition and about 1 to about 10 weight percent of a second composition, where said weight percents are based on the weight of said first mixture, (3) said first and second compositions are in the form of particles, (4) said first composition consists essentially of a first polymer, where said first polymer consists essentially of ethylene, and where said first polymer is a thermoplastic polymer, and where said ethylene is a majority of said first polymer based on the weight of said first polymer, (5) said second composition consists essentially of a colorant and a second polymer, where said second polymer consists essentially of ethylene, and where said second polymer has been crosslinked to form a thermoset polymer, and where said ethylene is a majority of said second polymer based on the weight of said second polymer, and where said second polymer does not have a density that is substantially isopycnic compared to said first polymer, (6) said extruding is conducted at a temperature above the melting point of said first polymer, but below the melting point of said second polymer, and below the decomposition temperature of said first polymer;

(b) using said second mixture to form said article, where said article has a granite-like appearance.

DETAILED DESCRIPTION OF THE INVENTION

The articles that can be produced in accordance with this invention vary widely. Examples of possible articles are sheet, wire coating, cable coating, pipe, molded fittings, packaging film, paper coating, toys, squeeze bottles, and especially, decorative construction materials.

The first step in the process is to extrude a first mixture to form a second mixture. Extrusion processes are well know in the art.[1]

[1] See Plastics Engineering Handbook of the Society of the Plastics Industry, Inc., 5th Edition, Edited by Michael Berins, published by Van Nostrand Reinhold (1991). Also see Plastic Materials and Processes, by Seymour S. Schwartz and Sidney H. Goodman, published by Van Nostrand Reinhold Company (1982).

The first and second mixtures are in the form of particles. These particles can vary in size. However, it is currently preferred to use particles that have a diameter from about 100 to about 10000 microns, it is more preferred to use particles that have a diameter from about 250 to about 8500 microns, and it is most preferred to use particles that have a diameter from about 500 to about 7000 microns.

The first mixture consists essentially of about 99 to about 90 weight percent of a first composition and about 1 to about 10 weight percent of a second composition, where said weight percents are based on the weight of said first mixture. However, it is preferred if the first composition is in the range of about 99 to about 95 weight percent and it is even more preferred if the first composition is in the range of 99 to 96 weight percent. Additionally, it is preferred if the second composition is in the range of about 1 to about 5 weight percent and it is even more preferred if the second composition is in the range of 1 to 4 weight percent.

The first and second compositions are in the form of particles. These particles can vary in size. However, it is currently preferred to use particles that have a diameter from about 100 to about 10000 microns, it is more preferred to use particles that have a diameter from about 250 to about 8500 microns, and it is most preferred to use particles that have a diameter from about 500 to about 7000 microns.

The first composition consists essentially of a first polymer. This first polymer is a thermoplastic polymer. This first polymer contains ethylene as the major component as measured by weight. This first polymer can consist essentially of a first copolymer, where said first copolymer consists essentially of ethylene and alpha-olefin. The alpha-olefin can have from 3–10 carbon atoms. Additionally, the alpha-olefin can be selected from the group consisting of propylene, 1-butene, 3-methyl-1-butene, 1-pentene, 3-methyl-1-pentene, 4-methyl-1-pentene, 1-hexene, 3-ethylene-1-hexene, 1-octene, and 1-decene. Mixtures of alpha-olefins can be use. It should be noted that ethylene is a majority of said first copolymer based on the weight of said first copolymer. The density of the first polymer varies widely, for example the density can be between 0.880 and 0.980 grams per cubic centimeters. However, currently densities from 0.880 to 0.952 grams per cubic centimeter are preferred. Additionally, densities above 0.958 are also preferred.

The second composition consists essentially of a colorant and a second polymer. The colorant can be obtained from a variety of sources. Suitable colorants can be determined by a person skilled in the art. Currently, black colorants are preferred. One method of making the second composition is to take a polymer and mix it with some carbon black to form a first black composition. Form this black composition into particles that can be rotomolded. Rotomold the particles, followed by grinding such particles into the desired size. The second polymer is a thermoset polymer. This second polymer contains ethylene as the major component as measured by weight. This second polymer can consist essentially of a second copolymer, where said second copolymer consists essentially of ethylene and alpha-olefin. The alpha-olefin can have from 3–10 carbon atoms. Additionally, the alpha-olefin can be selected from the group consisting of propylene, 1-butene, 3-methyl-1-butene, 1-pentene, 3-methyl-1-pentene, 4-methyl-1-pentene, 1-hexene, 3-ethylene-1-hexene, 1-octene, and 1-decene. Mixtures of alpha-olefins can be use. It should be noted that ethylene is a majority of said second copolymer based on the weight of said second copolymer. The density of the second polymer varies widely, for example the density can be between 0.880 and 0.980 grams per cubic centimeters. However, currently densities less than 0.941 grams per cubic centimeter are preferred. Additionally, densities above 0.946 are also preferred.

However, in any case, the second polymer does not have a density that is substantially isopycnic when compared to said first polymer.

Processes for producing these polymers are well known in the art.[2] Additionally, such polymers can also contain small amounts of additives, such as for example, protective agents, plasticizers, inorganic compounds, impact modifiers, processing modifiers, special-purpose compounds, flame-retardants, and smoke suppressants.

[2] Handbook of Polyolefins Synthesis and Properties, edited by Cornelia Vasile and Raymond B. Seymour, published by Marcel Dekker, Inc (1993).

The extrusion is conducted at a temperature above the melting point of said first polymer, but below the melting point of said second polymer, and below the decomposition temperature of said first polymer. This causes the first polymer to be in a substantially molten state. This allows the second polymer to be distributed randomly during the extrusion.

The thus produced second mixture can then be used to form articles that have a granite-like appearance. Methods of forming articles are well known in the art.[3]

[3] See Plastics Engineering Handbook of the Society of the Plastics Industry, Inc., 5th Edition, Edited by Michael Berins, published by Van Nostrand Reinhold (1991). Also see Plastic Materials and Processes, by Seymour S. Schwartz and Sidney H. Goodman, published by Van Nostrand Reinhold Company (1982).

One advantage to this invention is that no cellulosic fibers[4] are needed in order to obtain articles having a granite-like appearance. Additionally, there is no need for ceramic spheres.[5] Furthermore, no polyester resin need be used in this invention.[6] Finally, no mineral fillers are need to used this invention.[7]

[4] Cellulosic fibers are disclosed in U.S. Pat. No. 5,187,202.
[5] Ceramic spheres are disclosed in U.S. Pat. No. 4,849,456.
[6] Polyester resins are disclosed in U.S. Pat. No. 4,235,948.
[7] Mineral Fillers are disclosed in U.S. Pat. No. 4,137,215.

That which is claimed is:

1. A process to produce an article, where said article has a granite-like appearance, said process consisting essentially of:
   (a) extruding a first mixture to form a second mixture where,
      (1) said first and second mixtures are in the form of particles,
      (2) said first mixture consists essentially of about 99 to about 90 weight percent of a first composition and about 1 to about 10 weight percent of a second composition, where said weight percents are based on the weight of said first mixture,
      (3) said first and second compositions are in the form of particles,
      (4) said first composition consists essentially of a first polymer, where said first polymer consists essentially of ethylene, and where said first polymer is a thermoplastic polymer, and where said ethylene is a majority of said first polymer based on the weight of said first polymer,
      (5) said second composition consists essentially of a colorant and a second polymer, where said second polymer consists essentially of ethylene, and where said second polymer has been crosslinked to form a thermoset polymer, and where said ethylene is a majority of said second polymer based on the weight of said second polymer, and where said second polymer does not have a density that is substantially isopycnic compared to said first polymer,
      (6) said extruding is conducted at a temperature above the melting point of said first polymer, but below the melting point of said second polymer, and below the decomposition temperature of said first polymer;
   (b) using said second mixture to form said article, where said article has a granite-like appearance.

2. A process according to claim 1 wherein said first and second mixtures are in the form of particles where said particles have a diameter from about 250 to about 8500 microns.

3. A process according to claim 1 wherein said first and second mixtures are in the form of particles where said particles have a diameter from about 500 to about 7000 microns.

4. A process according to claim 1 wherein said first mixture consists essentially of about 99 to about 95 weight percent of said first composition and about 1 to about 5 weight percent of said second composition.

5. A process according to claim 1 wherein said first mixture consists essentially of about 99 to about 96 weight percent of said first composition and about 1 to about 4 weight percent of said second composition.

6. A process according to claim 1 wherein said first and second compositions are in the form of particles where said particles have a diameter from about 250 to about 8500 microns.

7. A process according to claim 1 wherein said first and second compositions are in the form of particles where said particles have a diameter from about 500 to about 7000 microns.

8. A process according to claim 1 wherein said first polymer consists essentially of a first copolymer, where said first copolymer consists essentially of ethylene and alpha-olefin.

9. A process according to claim 1 wherein said second polymer consists essentially of a second copolymer, where said second copolymer consists essentially of ethylene and alpha-olefin , and where said colorant is black.

10. An article produced according to claim 1.

11. A process to produce an article, where said article is a sheet, where said sheet has a granite-like appearance, said process consisting essentially of:
   (a) extruding a first mixture to form a second mixture where,
      (1) said first and second mixtures are in the form of particles,
      (2) said first mixture consists essentially of about 99 to about 90 weight percent of a first composition and about 1 to about 10 weight percent of a second composition, where said weight percents are based on the weight of said first mixture,
      (3) said first and second compositions are in the form of particles,
      (4) said first composition consists essentially of a first polymer, where said first polymer consists essentially of a first copolymer, and where said first copolymer consists essentially of ethylene and hexene, and where said first copolymer is a thermoplastic polymer, and where said ethylene is a majority of said first copolymer based on the weight of said first copolymer, and where said first copolymer has a density from 0.880 to 0.952 grams per cubic centimeter, (5) said second composition consists essentially of a colorant and a second polymer, where said second polymer consists essentially of a second copolymer, and where said second copolymer consists essentially of ethylene and hexene, and where said second copolymer has been crosslinked to form a thermoset polymer, and where said ethylene is a majority of said second copolymer based on the weight of said second copolymer, and where said second copolymer has a density less than 0.941 grams per cubic centimeter, and where said second copolymer does not have a density that is substantially isopycnic compared to said first copolymer, (6) said extruding is conducted at a temperature above the melting point of said first copolymer, but below the melting point of said second copolymer, and below the decomposition temperature of said first copolymer; and (b) using said second mixture to form said sheet, where said sheet has a granite-like appearance.

12. A process according to claim 11 wherein said first and second mixtures are in the form of particles where said particles have a diameter from about 250 to about 8500 microns.

13. A process according to claim 11 wherein said first and second mixtures are in the form of particles where said particles have a diameter from about 500 to about 7000 microns.

14. A process according to claim 11 wherein said first mixture consists essentially of about 99 to about 95 weight percent of said first composition and about 1 to about 5 weight percent of said second composition.

15. A process according to claim 11 wherein said first mixture consists essentially of about 99 to about 96 weight percent of said first composition and about 1 to about 4 weight percent of said second composition.

16. A process according to claim 11 wherein said first and second compositions are in the form of particles where said particles have a diameter from about 250 to about 8500 microns.

17. A process according to claim 11 wherein said first and second compositions are in the form of particles where said particles have a diameter from about 500 to about 7000 microns.

18. A process according to claim 11 wherein said first polymer consists essentially of a first copolymer, where said first copolymer consists essentially of ethylene and alpha-olefin.

19. A process according to claim 11 wherein said second polymer consists essentially of a second copolymer, where said second copolymer consists essentially of ethylene and alpha-olefin, and where said colorant is black.

20. An article produced according to claim 11.

21. A process to produce an article, where said article is a sheet, and where said sheet has a granite-like appearance, said process consisting essentially of:

(a) extruding a first mixture to form a second mixture where,
(1) said first and second mixtures are in the form of particles,
(2) said first mixture consists essentially of about 99 to about 90 weight percent of a first composition and about 1 to about 10 weight percent of a second composition, where said weight percents are based on the weight of said first mixture,
(3) said first and second compositions are in the form of particles,
(4) said first composition consists essentially of a first polymer, where said first polymer consists essentially of a first copolymer, and where said first copolymer consists essentially of ethylene and hexene, and where said first copolymer is a thermoplastic polymer, and where said ethylene is a majority of said first copolymer based on the weight of said first copolymer, and where said first copolymer has a density greater than 0.958 grams per cubic centimeter,
(5) said second composition consists essentially of a colorant and a second polymer, where said second polymer consists essentially of a second copolymer, and where said second copolymer consists essentially of ethylene and hexene, and where said second copolymer has been crosslinked to form a thermoset polymer, and where said ethylene is a majority of said second copolymer based on the weight of said second copolymer, and where said second copolymer has a density less than 0.941 grams per cubic centimeter,
(6) said extruding is conducted at a temperature above the melting point of said first copolymer, but below the melting point of said second copolymer, and below the decomposition temperature of said first copolymer; and (b) using said second mixture to form said sheet, where said sheet has a granite-like appearance.

22. A process according to claim 21 wherein said first and second mixtures are in the form of particles where said particles have a diameter from about 250 to about 8500 microns.

23. A process according to claim 21 wherein said first and second mixtures are in the form of particles where said particles have a diameter from about 500 to about 7000 microns.

24. A process according to claim 21 wherein said first mixture consists essentially of about 99 to about 95 weight percent of said first composition and about 1 to about 5 weight percent of said second composition.

25. A process according to claim 21 wherein said first mixture consists essentially of about 99 to about 96 weight percent of said first composition and about 1 to about 4 weight percent of said second composition.

26. A process according to claim 21 wherein said first and second compositions are in the form of particles where said particles have a diameter from about 250 to about 8500 microns.

27. A process according to claim 21 wherein said first and second compositions are in the form of particles where said particles have a diameter from about 500 to about 7000 microns.

28. A process according to claim 21 wherein said first polymer consists essentially of a first copolymer, where said first copolymer consists essentially of ethylene and alpha-olefin.

29. A process according to claim 21 wherein said second polymer consists essentially of a second copolymer, where said second copolymer consists essentially of ethylene and alpha-olefin, and where said colorant is black.

30. An article produced according to claim 21.

31. A process to produce an article, where said article is a sheet, and where said sheet has a granite-like appearance, said process consisting essentially of:

(a) extruding a first mixture to form a second mixture where,
  (1) said first and second mixtures are in the form of particles,
  (2) said first mixture consists essentially of about 99 to about 90 weight percent of a first composition and about 1 to about 10 weight percent of a second composition, where said weight percents are based on the weight of said first mixture,
  (3) said first and second compositions are in the form of particles,
  (4) said first composition consists essentially of a first polymer, where said first polymer consists essentially of a first copolymer, and where said first copolymer consists essentially of ethylene and hexene, and where said first copolymer is a thermoplastic polymer, and where said ethylene is a majority of said first copolymer based on the weight of said first copolymer, and where said first copolymer has a density from 0.880 to 0.952 grams per cubic centimeter,
  (5) said second composition consists essentially of a colorant and a second polymer, where said second polymer consists essentially of a second copolymer, and where said second copolymer consists essentially of ethylene and hexene, and where said second copolymer has been crosslinked to form a thermoset polymer, and where said ethylene is a majority of said second copolymer based on the weight of said second copolymer, and where said second copolymer has a density greater than 0.946 grams per cubic centimeter, and where said second copolymer does not have a density that is substantially isopycnic compared to said first copolymer,
  (6) said extruding is conducted at a temperature above the melting point of said first copolymer, but below the melting point of said second copolymer, and below the decomposition temperature of said first copolymer; and (b) using said second mixture to form said sheet, where said sheet has a granite-like appearance.

32. A process according to claim 31 wherein said first and second mixtures are in the form of particles where said particles have a diameter from about 250 to about 8500 microns.

33. A process according to claim 31 wherein said first and second mixtures are in the form of particles where said particles have a diameter from about 500 to about 7000 microns.

34. A process according to claim 31 wherein said first mixture consists essentially of about 99 to about 95 weight percent of said first composition and about 1 to about 5 weight percent of said second composition.

35. A process according to claim 31 wherein said first mixture consists essentially of about 99 to about 96 weight percent of said first composition and about 1 to about 4 weight percent of said second composition.

36. A process according to claim 31 wherein said first and second compositions are in the form of particles where said particles have a diameter from about 250 to about 8500 microns.

37. A process according to claim 31 wherein said first and second compositions are in the form of particles where said particles have a diameter from about 500 to about 7000 microns.

38. A process according to claim 31 wherein said first polymer consists essentially of a first copolymer, where said first copolymer consists essentially of ethylene and alpha-olefin.

39. A process according to claim 31 wherein said second polymer consists essentially of a second copolymer, where said second copolymer consists essentially of ethylene and alpha-olefin, and where said colorant is black.

40. An article produced according to claim 31.

* * * * *